(12) United States Patent
Spruit et al.

(10) Patent No.: US 6,714,508 B1
(45) Date of Patent: Mar. 30, 2004

(54) OPTICAL RECORDING CARRIER HAVING GROOVE WOBBLE PHASE CHANGES BETWEEN SUBSEQUENT PREDETERMINED POSITIONS

(75) Inventors: Johannes Hendrikus Maria Spruit, Eindhoven (NL); Johannes Josephus Leonardus Maria Van Vlerken, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/577,546

(22) Filed: May 24, 2000

(30) Foreign Application Priority Data

Jun. 2, 1999 (EP) ............................ 99201748

(51) Int. Cl.⁷ ................................ G11B 7/24
(52) U.S. Cl. .................................. 369/275.4
(58) Field of Search ............ 369/275.3, 275.4, 369/275.2, 277, 278, 279; 428/64.1, 64.4, 64.2; 430/320, 321

(56) References Cited

U.S. PATENT DOCUMENTS

| | | | |
|---|---|---|---|
| 6,069,870 A | * 5/2000 | Maeda et al. | 369/275.4 |
| 6,208,614 B1 | * 3/2001 | Kim | 369/275.4 |
| 6,266,318 B1 | * 7/2001 | Honda et al. | 369/275.3 |
| 6,269,071 B1 | * 7/2001 | Van Den Enden et al. | 369/275.4 |
| 6,295,270 B1 | * 9/2001 | Van Den Enden et al. | 369/275.4 |

* cited by examiner

*Primary Examiner*—Tan Dinh
(74) *Attorney, Agent, or Firm*—Michael E. Belk

(57) ABSTRACT

An optical record carrier (1) is provided with tracks having a groove (4) wobbled in a radial direction and predetermined positions (18) along the track. Embossed pits (18) at the predetermined positions represent addressing information. The phase of the wobble near the predetermined positions depends on whether a pit is present (18) on a predetermined position or not (19). The wobble changes phase between each two subsequent predetermined positions of which one on the positions contains no pit and the other position contains a pit.

11 Claims, 3 Drawing Sheets

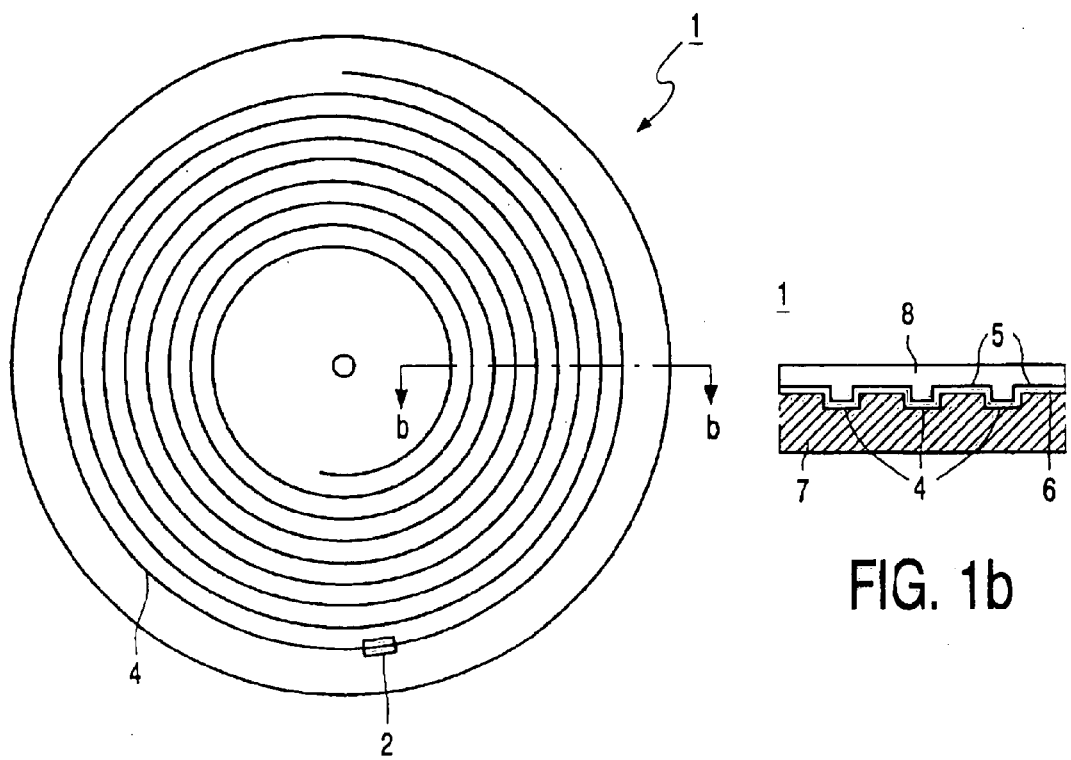
FIG. 1b
FIG. 1a
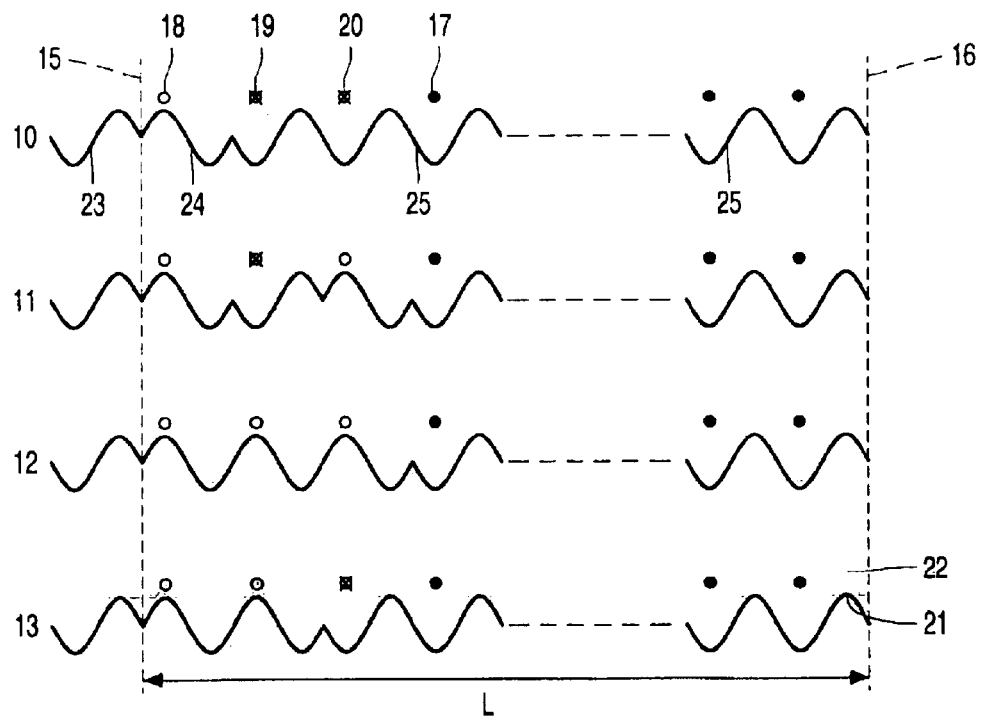
FIG. 2

OPTICAL RECORDING CARRIER HAVING GROOVE WOBBLE PHASE CHANGES BETWEEN SUBSEQUENT PREDETERMINED POSITIONS

FIELD OF THE INVENTION

The invention relates to an optical record carrier comprising a recording layer having substantially parallel tracks for recording information in a pattern of optically detectable marks, the tracks being provided with wobbled grooves and predetermined positions at regular intervals along the tracks, part of the predetermined positions forming information positions on which information is stored in the form of pits.

When writing user information on a record carrier by means of a scanning radiation spot, it is in general desirable to know the position of the radiation spot on the record carrier. Since user information is not available on a virgin recordable record carrier to determine the position from, the position may be determined by reading position information stored in an embossed wobbled groove or embossed pits of the record carrier.

The recorded information is arranged in tracks. In general, a track is a line on the record carrier to be followed by a scanning device and which has a length of the order of a characteristic dimension of the record carrier. A track on a rectangular record carrier has a length substantially equal to the length or width of the record carrier. A track on a disc-shaped record carrier is a 360° turn of a continuous spiral line or a circular line on the disc.

A track may comprise a groove and/or a land portion between grooves. A groove is a trench-like feature in a land portion of the recording layer, the bottom of the trench being nearer to or further away from the light-incident side of the record carrier. User information may be recorded on the lands and/or in the grooves in the form of optically detectable areas in the recording layer, e.g. as areas having a characteristic reflection or magnetization. The pits may be located on the lands or in the grooves.

BACKGROUND

A record carrier according to the preamble is known from European patent application no. 0 800 165, which discloses an optical record carrier having a groove, radially wobbled at a constant frequency without phase jumps and comprising pits formed at predetermined positions between turns of the wobbled groove. The pits are at predetermined positions where the wobble has a minimum or maximum deviation as measured from the centre of the pits. A disadvantage of this known record carrier is that the reliability of the detection of the pits reduces when user information is recorded in the tracks.

SUMMARY OF THE INVENTION

It is an object of the invention to provide a record carrier having a pit-groove structure which can be detected more reliably.

In accordance with the invention, the record carrier as described in the opening paragraph is characterised in that the phase of the wobble at the information positions is adapted to the presence of a pit at such a predetermined position, and the wobble changes phase between each two subsequent predetermined positions of which one of the positions contains no pit and the other position is an information position containing a pit. According to the invention, the phase of the wobble at a certain position along the track must be adapted to the presence or absence of a pit at such a position. The wobble of the groove enhances the signal obtained from the pits when scanning the record carrier. The detection margin of the pits will be substantially increased when the phase has a first value at a predetermined position where there is a pit and a second, different value at a predetermined position where there is no pit. The change in phase of the wobble between two consecutive positions, one without a pit and one with a pit, enhances the amplitude of a read signal from the record carrier. If an information position containing a pit is not preceded by another information position, the wobble must also show a phase change between the information position and the position preceding it, in order to achieve a proper detection margin also for the first information pit of a sequence of pits. The same applies to an information position followed by a position which is not an information position. The increased detection margin allows a reduction of the size of the pits, thereby reducing crosstalk from the pits on the signal representing user information recorded in the tracks. The increased margins also allow proper detection of the position information on a record carrier on which user information has been recorded.

The number of periods of the wobble on the record carrier having a phase pertaining to an information position containing no pit is preferably larger than the number of periods of the wobble having a different phase. Alternatively, the predetermined positions are preferably arranged in cells of substantially equal extent containing a number of periods of the wobble, the majority of the number of periods in substantially all cells having the same phase.

The equal phase of the majority of periods of the wobble facilitates synchronous detection of those periods of the wobble having a different phase. When the predetermined positions are arranged in cells, the first period of the wobble after the start of the cell pertains preferably to an information position having a pit. The pit and the associated phase of the wobble can be used as synchronisation mark, identifying the start of the cell. The detection margin of the pit will be increased if there is a phase change between the wobble and the last wobble of the preceding cell. The combination of a phase change in the wobble immediately followed by a pit further improves the recognition of the start of the cell. If several cells are grouped in sectors, the first cell of a sector has preferably a unique pattern of pits, e.g. a pit at each of the first two positions of the first cell, for synchronisation on the sector. The extent of a cell may be a linear extent, measured along a track and useful for a record carrier of the constant angular velocity (CLV) type, or it may be an angular extent, measured over an angular displacement of a circular system of tracks and useful for a record carrier of the constant angular velocity (CAV) type.

To enhance the read signal, the wobble has preferably a minimum value, as measured from the centre line connecting the pits along a track, at an information position with pit and a maximum value at an information position without pit. In other words, a minimum value of the wobble is a deviation of the groove in the direction of the pit. When the pits are located on a land portion between two neighbouring grooves, the two grooves are preferably in anti-phase. When the pits are depressions in the land and the grooves are trench-like, the information positions with pit are preferably located at positions where the land has a minimum width and the information positions without pit are preferably located at positions where the land has a maximum width.

The information positions may be arranged at equidistant positions along a track. They may also be grouped in series and the wobble in between subsequent series of information positions in the track direction may represent information. When the information in the wobble is encoded by phase-shift keying, the same phase variation of the wobble may be used for parts of the groove at the position of the predetermined positions and for parts of the groove in between the series of predetermined positions.

The predetermined positions are preferably grouped in doublets of two neighbouring predetermined positions, and only one pit is present in each doublet. A single logical value may be assigned to a doublet, e.g. a pit followed by a non-pit is a '1' and a non-pit followed by a pit is a '0'. When the presence of a pit at both positions in a doublet is determined, the detection margin between a '1' and a '0' is increased compared to a detection at a single position.

In a record carrier wherein land portions are arranged between neighbouring grooves, the land portions are preferably alternatingly provided with pits and without pits.

When scanning a groove, there are pits on only one side of the groove, thereby reducing cross talk in the read signal between neighbouring tracks.

The objects, advantages and features of the invention will be apparent from the following more particular description of preferred embodiments of the invention, as illustrated in the accompanying drawings, in which

BRIEF DESCRIPTION OF THE DRAWINGS

FIGS. 1a and 1b show embodiments of a record carrier according to the invention, FIG. 2 shows an enlarged sections of four tracks on the record carrier.

DETAILED DESCRIPTION OF THE INVENTION

Figure 3:
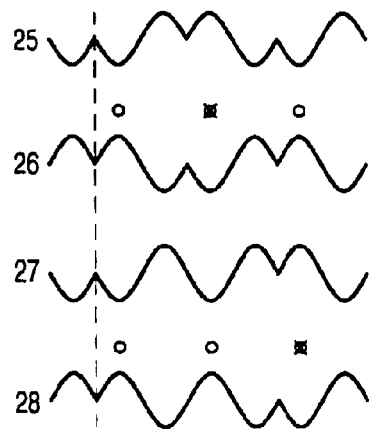
FIG. 3 shows four neighbouring tracks having wobbled grooves.

FIG. 1 shows an embodiment of a record carrier 1 according to the invention, FIG. 1a being a plan view and FIG. 1b showing a small part in a sectional view taken along the line b—b. The record carrier 1 comprises a series of tracks, each forming a 360° turn of a spiral line, of which some eight are shown in the Figure. A track is constituted, for example, by a preformed groove 4 or ridge 5 or a combination of a groove and a ridge. The tracks are intended for guiding a radiation beam along the tracks. For the purpose of recording information, the record carrier 1 comprises a recording layer 6, which is deposited on a transparent substrate 7 and which is covered by a protective coating 8. The tracks are scanned by a radiation beam entering the record carrier through substrate 7. The recording layer is made of a radiation-sensitive material which, if exposed to suitable radiation, is subjected to an optically detectable change. Such a layer may be, for example, a thin layer of material such as tellurium, which changes reflection upon heating by a radiation beam. Alternatively, the layer may consist of magneto-optic or phase-change materials, which change direction of magnetization or crystalline structure, respectively, upon heating. Examples of phase change materials are compounds comprising tellurium such as AgInSbTe or GeSbTe. When the tracks are scanned by a radiation beam the intensity of which is modulated in conformity with the information to be recorded, an information pattern of optically detectable marks is obtained, which pattern is representative of the information. In a non-recordable, read-only part of the record carrier the layer 6 may be a reflective layer, for example made from a metal such as aluminium or silver. The information in such a record carrier is prerecorded in the record carrier during its manufacture, for example in the form of embossed pits.

The groove period in a radial direction of the record carrier is 0.74 $\mu$m, the widths of the land portion 5 and of the groove 4 may be equal, or the width of the groove portion may be equal to 0.4 times the track pitch. The depth of the groove is 50 nm. The record carrier is suitable for being scanned by a radiation beam having a wavelength between 635 and 650 nm.

FIG. 2 shows an enlarged plan view of four tracks portions 10–13, each comprising a bit cell 14 of an extent indicated by the length of the arrow in the Figure and having a different information content. The four portions are from individual tracks and need not be neighbouring tracks. The vertical dashed lines 15 and 16 serve to indicate the equal extent of each bit cell. Each of the tracks are arranged on a disc-shaped record carrier. The record carrier of this embodiment comprises a series of tracks in the form of a spiral along which the information can be recorded at a constant linear density, i.e. the record carrier is of the CLV type. Each bit cell contains sixteen 360° periods of a sinusoidal groove wobble. The groove 21 of a track is indicated by a thick undulating line. The width of the groove in FIG. 2 is exaggerated with respect to the amplitude of the wobble for reasons of clarity. The land portion 22 in the Figure immediately above groove 21 pertains to that groove. User information is written in the grooves by a radiation beam which is guided along the centre line of the groove.

Each bit cell comprises sixteen equally spaced predetermined positions. The positions are on the land portions in between neighbouring grooves. The positions are at 90°±10° of the period of the wobble. In an alternative embodiment of the record carrier the positions are at 270°±10°. The positions in a cell are divided in two types. The position of the first type is not intended for storing position information and is indicated by a dot 17. The position of the second type, called an information position, is intended for storing position information in the form of the presence or absence of a pit. An information position 18 with pit is indicated by a circle, an information position 19 without a pit by a crossed circle. Each bit cell in FIG. 2 starts with three information positions 18, 19 and 20, followed by thirteen positions not intended for information storage. The position information may comprise address information, e.g. track number and sector number of the portion of the track being scanned, the layer number in a multilayer record carrier, directory information relating content of the record carrier to an address, and information useful for the writing process such as an identification of the type of the record carrier, e.g. write-once, rewritable, the purpose of the record carrier, e.g. general purpose or special, restricted purpose, physical information on the record carrier, e.g. track pitch, reference velocity, diameter of the record carrier, reflectivity, write conditions and an indication of the manufacturer and error-correction data.

A pit at an information position may be represented by a "1", whereas the absence of a pit at an information position may be represented by a "0". The cells in track portions 10–13 represent the following patterns: "100", "101", "111" and "110". The cell with the pattern "100" represents a logical "0". The cell with the pattern "101" represents a logical "1". The cells with the patterns "111" and "110" represent synchronisation marks. Hence, each cell codes for a single bit or for a synchronisation mark. If ordinal numbers are assigned to the tracks on the record carrier, the pattern "111" may represent a synchronisation mark for even numbered tracks and the pattern "110" a synchronisation mark for odd numbered tracks. The two synchronisation marks may also be used to differentiate between two different positions of the cell along a track.

The cells are grouped in sectors of sixty-four cells. The first cell of a sector contains a synchronisation mark. The sequence of sixty-three logical values in the subsequent bit cells represent the position information.

The phase of the wobble of the groove is such that the deviation of the groove shown in the Figure has a minimum value at an information position 18 with pit and a maximum value at an information position 19 without a pit, when measured from the centre line connecting the pits along a track The phase of the wobbles depends on the logical value represented by the bit cell. The adaptation of the phase of the groove wobble to the presence of pits in the land pertaining to the groove results in the occurrence of phase jumps in the wobble, which have a magnitude of 180° in this embodiment. This allows a scanning device to derive the information stored in the cells from the modulation of the radiation beam from the record carrier and generated by the pits, and also from the modulation generated by the phase of the wobble. When the radiation beam follows track 13, the information stored in the pits on land portion 22 can be derived from the so-called push-pull signal. The same information can be obtained from the groove 21.

The phase of the last wobble 23 in a cell in FIG. 2 is adapted to the phase of the first wobble 24 of the subsequent cell in such a way as to show a phase change between the two wobbles. The phase change is 180°. The first position 18 of each cell contains a pit indicating the start of the cell. The phase change increases the detection margin of the pit. The wobbles pertaining to the positions without information, i.e. from wobble 25 pertaining to position 17 in track portion 10 to the last wobble 26 of the cell, have equal phases. The presence of at least thirteen wobbles out of sixteen with the same phase simplifies the generation of a clock signal from the wobbles. In an alternative embodiment the phase of the wobbles 25 to 26 is not equal and the changing phase of the wobbles may be used to store information. In that case more than half of the number of wobbles in a cell have preferably the same phase. A logical '1' may be coded as one period of a sinusoidal wobble, a logical '0' as one period of a 180° phase-shifted sinusoidal wobble.

Although the information positions 18–20 in the embodiment shown in FIG. 2 are consecutive, they may be separated by one or more positions without information. To facilitate the detection of the pits at information positions, the wobble pertaining to the position immediately preceding an information position having a pit should have the phase of a wobble pertaining to an information position without a pit. Preferably, the wobbles pertaining to all positions without information should have the phase of a wobble pertaining to an information position without a pit.

FIG. 2 shows combinations of one groove and one land. There are several alternative ways to combine the groove-land combinations to a sequence of lands and grooves covering the recordable area of the record carrier. In a first embodiment the grooves and lands are arranged as shown in FIG. 2, where the width of the lands is of the same size as the width of the grooves. When the radiation beam follows track 13, it should preferentially detect the pits on the land 22 pertaining to the groove 21. In a second embodiment, as shown in FIG. 3, the lands between grooves are alternatingly with and without pits to reduce crosstalk between neighbouring lands. The phase of the wobbles of neighbouring grooves 25 and 26 are in antiphase and adapted to the presence or absence of pits at the information positions on the land in between the two grooves. Likewise, the phase of the wobbles of neighbouring grooves 27 and 28 are also in antiphase and adapted to the presence or absence of pits at the information positions. The information stored in the pits on a land portion is common to the two grooves on both sides of the land portion. The scanning device can determine whether it scan an even groove 25 or an odd groove 26 from the phase of the first period of the wobble in the cell.

Figure 4:
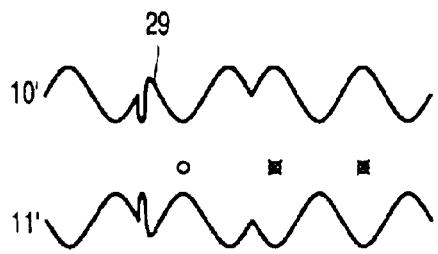
FIG. 4 shows two neighbouring tracks having clock marks.

FIG. 4 shows an alternative embodiment of groove wobbles according to the invention. Each track comprises one or more so-called clock marks 29, i.e. a relatively fast modulation of the groove, at the start of a cell. A clock mark in an even-numbered track 10' changes from a zero deviation to a minimum deviation, to a maximum deviation and back to a zero deviation. The deviation is the distance of the centre-line of the groove to the centre line of the land portion on which the information positions are located. A clock mark in an odd-numbered track 11' changes from a zero deviation to a minimum deviation, to a maximum deviation and back to a zero deviation. The clock marks may be used for synchronisation purposes. The polarity of a clock mark may be used to determine whether the track being scanned is an even-numbered track or an odd-numbered track.

The invention is not limited to the wobble patterns shown in the Figures. The average value of the deviation of each wobble or of a series of wobbles is preferably equal to zero in order to avoid offsets in the radial tracking of the radiation beam. The wobbles may comprise sections with zero deviation in order to avoid sharp transitions in the deviation. Instead of the sinusoidal wobble, other forms of wobbles may be used, such as a triangular wobble or a sinc-function wobble.

Figure 5:
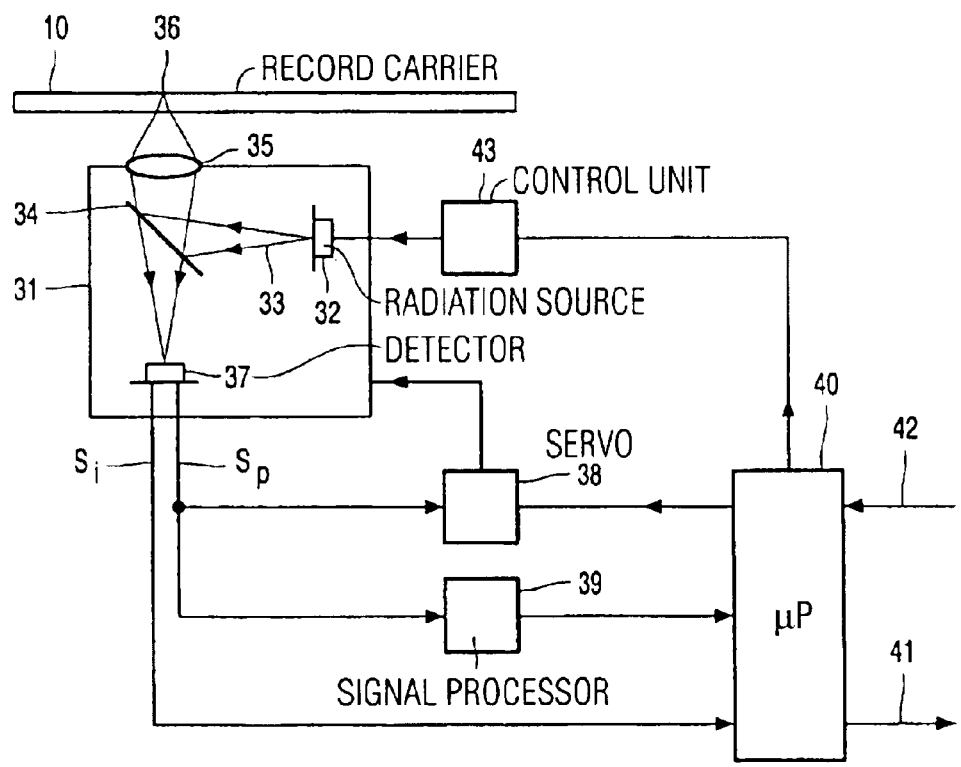
FIG. 5 shows a scanning device for the record carrier.

FIG. 5 shows an apparatus for scanning a record carrier as shown in FIG. 1.

The apparatus comprises an optical system 31 for optically scanning tracks in record carrier 10. Optical system 31 comprises a radiation source 32, for example a semiconductor laser. Radiation source 32 emits a radiation beam 33, which is reflected by a beam splitter 34 and converged by an objective lens 35 to a radiation spot 36 on the tracks in an information layer of record carrier 10. Radiation reflected from the record carrier is guided through objective lens 35 and beam splitter 34 to a detector 37. The detector is a split-detector having a dividing line between the two halves of the detector running parallel to the direction of the tracks being scanned. The sum signal of the two halves, usually called the central aperture signal, represents the information recorded in the tracks and is output as signal $S_i$. The difference signal of the two halves, usually called the push-pull signal, represents position information and servo information recorded in the tracks, and is output as signal $S_p$. The low-frequency content of the signal $S_p$ represents the servo information, indicating the position of the radiation spot 36 with respect to the centre-line of the track being scanned. The signal $S_p$ is used as input for a servo circuit 38, possibly after a low-pass filter which passes the servo information but blocks the position information. The servo circuit controls the position of the radiation spot in a direction perpendicular to the direction of the track by controlling the position of optical system 31 and/or the position of objective lens 35 within the optical system.

Figure 6:
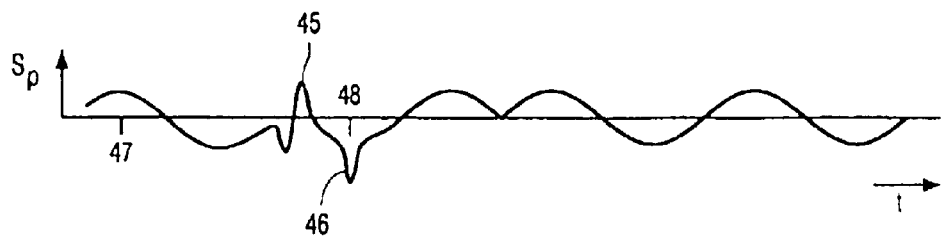
FIG. 6 shows a signal modulated by pits and groove wobble.

The signal $S_p$ is also fed into a signal processor 39, which extracts the position information from the signal $S_p$. The position-information signal output from signal processor 39 is fed into a micro-processor 40, as shown in FIG. 6. The micro-processor can derive, for example, the current position of radiation spot 36 on record carrier 10 from the position-information signal. During reading, erasing or writing, the micro-processor can compare the current position with a desired position and determine the parameters for a jump of the optical system to the required position. The parameters for the jump are fed into servo circuit 38. The information signal $S_i$ is fed into the micro-processor, enabling it to derive for instance directory information from the signal, which may be used for controlling the position of the radiation spot. The information signal is provided as output signal 41 of micro-processor 40.

When writing user information on a record carrier having prerecorded servo tracks comprising position information, the user information to be recorded is fed into micro-processor 40 by a signal 42. The scanning device reads the position information from the servo tracks. Micro-processor 40 synchronises the information to be written with the position information and generates a control signal which is connected to a source control unit 43. Source control unit 43 controls the optical power of the radiation beam emitted by radiation source 32, thereby controlling the formation of marks in record carrier 10. The synchronisation may involve the imposition of a fixed relation between the synchronisation patterns in the position information and synchronisation patterns present in the user information signal to be recorded.

FIG. 6 shows part of the push-pull signal $S_p$ as a function of time t during the period the radiation beam scans the part of track 10' shown in FIG. 4. The clock mark 29 shows up as a feature 45 having relatively high-frequency components. The pit in the cell shows up as a peak 46 on the wobbled signal. The peak increases the signal level of the wobble at the position of the peaks, thereby increasing the detection margin. A signal processor may extract the position information by sampling the push-pull signal $S_p$ at the 90° position of each period of the wobbles, such as positions 47 and 48 in FIG. 6. The amplitudes of the signal at those positions show that the phase reversal of the wobble between the two positions enhances the detection margin.

Figure 7:
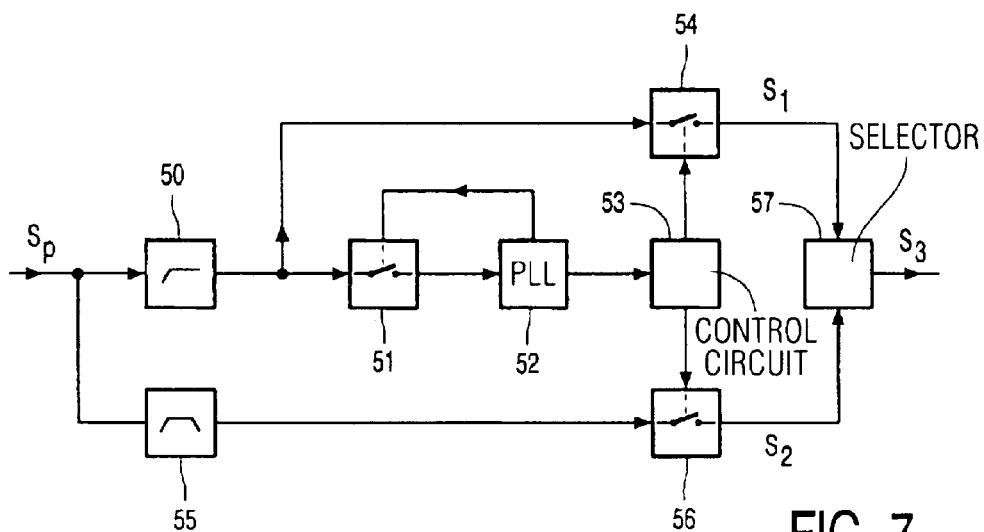
FIG. 7 shows a signal processor for deriving position information from the wobbles and pits.

FIG. 7 shows an embodiment of the signal processor 39 for extracting position information from the push-pull signal $S_p$. The signal $S_p$ is connected to a high-pass filter 50 that passes signal components related to the clock marks and pits but blocks those related to the servo information and the wobble. The high-pass filtered signal is passed to a sampler 51, having a switch which closes during a short time interval around the expected position of each clock mark. The output of the sampler is connected to a phase-locked loop (PLL) 52, that stabilizes a clock by means of the clock marks. The PLL sets the period during which sampler 51 passes the clock marks, thereby avoiding interference from other high-frequency components in the signal $S_p$, such as from the pits. The frequency of the clock is sufficiently high to set accurately the sample moments for deriving the information from $S_p$. The clock signal of the PLL is connected to a control circuit 53, which generates trigger signals for samplers.

The filtered signal formed by high-pass filter 50 is connected to a sampler 54 controlled by a first trigger signal from control circuit 53. The first trigger signal closes the switch of the sampler only at the predetermined positions along the track currently being scanned. Since the predetermined positions are related to the positions of the clock marks, control circuit 53 can generate the first trigger signal from the clock of the PLL, which is based on the clock marks. The output of sampler 54 is a first information output signal $S_1$ comprising the information represented by the pits.

Signal $S_p$ is connected to a band-pass filter 55 that passes signal components in a band centred on the frequency of the groove wobble. The band-pass filtered signal is connected to a sampler 56 controlled by a second trigger signal from control circuit 53. The second trigger signal closes the switch of sampler 56 at positions along the track currently being scanned where the wobble reaches an extreme position. The output of sampler 56 is a second information output signal $S_2$ comprising the information represented by the groove wobble.

Elements 50 to 54 can be regarded as a first signal processor for deriving information represented by the pits from $S_p$, whereas elements 50 to 53, 55 and 56 can be regarded as a second signal processor for deriving information represented by the wobble from $S_p$. The information signals $S_1$ and $S_2$ of the two signal processors are fed into selector means 57, which forms an information signal $S_3$ from $S_1$, $S_2$ or a combination of $S_1$ and $S_2$. Since the phase of the wobble corresponds to the presence of pits at the predetermined positions along a track, the information stored in the pits is in general identical to the information stored in the wobble near the predetermined positions. The choice between signals $S_1$ and $S_2$ may be determined by the quality of the signals, which the scanning device may establish by means of an error-correction/detection circuit operating on the information and an error-correcting/detecting code embedded in the information. The choice may also be determined by the status of the record carrier. Since the quality of the $S_1$ is generally good for unwritten record carriers, selection means 57 may form information signal $S_3$ from the 'pit' signal $S_1$ when scanning an unwritten record carrier and from the 'wobble' signal $S_2$ when scanning a written record carrier. Selector means 57 may form information signal $S_3$ as a combination of signals $S_1$ and $S_2$, by using signal $S_1$ for the information represented by the pits and signals $S_2$ for the information stored in the wobble of the bit cells outside the predetermined positions along the track.

Signal $S_3$ may be processed in order to extract synchronization signals from the information and to assign logical values to doublets or triplets as described above. The pits and/or wobble represent preferably addressing information for the record carrier. Information signal $S_3$ may then be used as input to micro-processor 40 for controlling the position of the radiation beam on the record carrier.

Signal processor 39 may comprise a phase detector for determining the phase of the clock marks 23. The phase may be used to determine whether the track currently being scanned is an even or an odd track.

Figure 8:
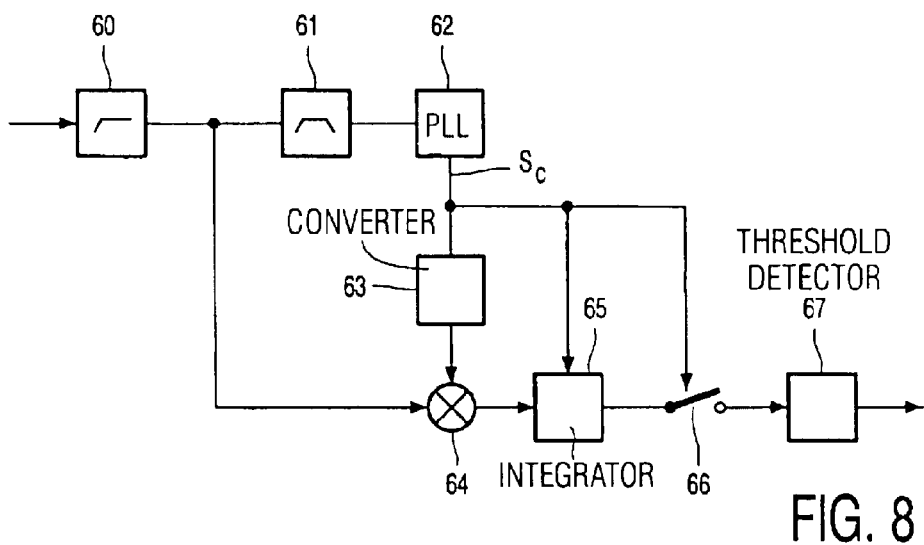
FIG. 8 shows a signal processor for deriving position information from the wobbles

FIG. 8 shows an alternative embodiment of signal processor 39 for deriving position information from the wobble by synchronous detection of the push-pull signal. The push-pull signal $S_p$ is filtered by a high-pass filter 60 to remove disturbances having a frequency lower than 1 kHz. The output signal of filter 60 is subsequently filtered by a bandpass filter 61 having a centre frequency equal to the frequency of the wobbles. The phase-locked loop 62 locks a digital clock signal $S_c$ to the filtered wobble signal. Phase changes in the wobble signal should be relatively infrequent to avoid instabilities in the clock signal. Clock signal $S_c$ is processed by converter 63, which converts the digital input signal into a sinusoidal signal having the same period as $S_c$. The output signal of converter 63 and the high-pass filtered wobble signal from filter 60 are multiplied by a multiplier 64. The output of the multiplier is integrated over a period of the wobble in integrator 65. At the end of a wobble the integrated value is sampled by a switch 66, operated by clock signal $S_c$, and passed to a threshold detector 67. After the sample has been taken, the integrator is reset by clock signal $S_c$. The threshold detector digitizes the samples with reference to a threshold of zero. The output signal of threshold detector 67 is the digitized phase of the wobbles, from which the position information may be derived. If the phase of the wobbles corresponds to the embodiment shown in FIG. 2, the start of a cell can be derived from the output signal of threshold detector 67 as the position where the value of the signal changes after thirteen periods without a change.

What is claimed is:

1. An optical record carrier comprising a recording layer having substantially parallel tracks for recording information in a pattern of optically detectable marks, the tracks being provided with wobbled grooves and predetermined positions at regular intervals along the tracks, part of the predetermined positions forming information positions on which information is stored in the form of pits, and the phase of the wobble at the information positions depends on the presence of a pit at such a predetermined position, and the wobble changes phase between each two subsequent predetermined positions of which one of the positions contains no pit and the other position is an information position containing a pit.

2. The optical record carrier of claim 1, wherein the number of periods of the wobble on the record carrier having a phase pertaining to an information position containing no pit is larger than the number of periods of the wobble having a different phase.

3. The optical record carrier of claim 1, wherein the predetermined positions are arranged in cells, and the first period of the wobble after the start of the cell pertains to an information position having a pit.

4. The optical record carrier of claim 1, wherein the wobble has a minimum value at an information position with pit and a maximum value at an information position without pit.

5. The optical record carrier of claim 1, wherein the information positions are grouped in series and the wobble in between the series of information positions in the track direction represents information.

6. The optical record carrier of claim 5, wherein the information in the wobble is encoded by phase-shift keying.

7. The optical record carrier of claim 1, wherein the predetermined positions are arranged between neighboring grooves.

8. The optical record carrier of claim 7, wherein the phase of the wobble of only one of the neighboring grooves is adapted to the presence of a pit at an information position.

9. The optical record carrier of claim 7, wherein the phases of both neighboring grooves are adapted to the presence of a pit at an information position and the wobbles of both neighboring grooves are in anti-phase.

10. Optical record carrier according to claim 1, wherein the information positions are grouped in doublets of two neighboring predetermined positions, and one pit is present in each doublet.

11. Optical record carrier according to claim 1, wherein land portions are arranged between neighboring grooves, and land portions are alternatingly provided with pits and without pits.

* * * * *